United States Patent
Hiroe et al.

(10) Patent No.: US 7,619,376 B2
(45) Date of Patent: Nov. 17, 2009

(54) DETENT MECHANISM

(75) Inventors: Terukazu Hiroe, Aichi (JP); Masahiko Miyata, Aichi (JP); Seiji Ishigaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 358 days.

(21) Appl. No.: 11/798,857

(22) Filed: May 17, 2007

(65) Prior Publication Data
US 2007/0267283 A1 Nov. 22, 2007

(30) Foreign Application Priority Data
May 18, 2006 (JP) .......................... P.2006-138858

(51) Int. Cl.
*H01H 21/50* (2006.01)
(52) U.S. Cl. ............................ 318/2; 318/159; 318/162; 318/436; 200/17 B
(58) Field of Classification Search ............... 318/1, 318/2, 159, 162, 436, 685, 696; 200/17 R, 200/17 B, 404
See application file for complete search history.

(56) References Cited

U.S. PATENT DOCUMENTS

| | | | | |
|---|---|---|---|---|
| 3,586,953 A | * | 6/1971 | Markkanen et al. | 318/68 |
| 4,442,392 A | * | 4/1984 | Hore | 318/696 |
| 4,553,080 A | * | 11/1985 | Cannon et al. | 318/696 |
| 4,560,983 A | * | 12/1985 | Williams | 340/825 |
| 4,859,922 A | * | 8/1989 | Tauchenitz et al. | 318/628 |
| 5,034,670 A | | 7/1991 | Tominaga | |
| 5,189,355 A | * | 2/1993 | Larkins et al. | 318/685 |
| 5,220,260 A | * | 6/1993 | Schuler | 318/561 |
| 6,123,468 A | * | 9/2000 | Furlani et al. | 396/463 |
| 2004/0124717 A1 | | 7/2004 | Corcoran et al. | |

FOREIGN PATENT DOCUMENTS

| | | |
|---|---|---|
| GB | 2 199 926 A | 7/1988 |
| GB | 2 412 421 A | 9/2005 |
| JP | 5-94922 | 4/1993 |

* cited by examiner

*Primary Examiner*—Bentsu Ro
(74) *Attorney, Agent, or Firm*—Morgan, Lewis & Bockius LLP

(57) ABSTRACT

A detent mechanism includes: a control member to be operated rotationally; a rotary member including a pair of magnetic poles adapted to rotate in conjunction with the control member; a plurality of electromagnets provided along a rotational path of the magnetic poles of the rotary member; and a detent controller that has a detent energization pattern in which a current energization direction and an energization amount are determined for the plurality of electromagnets. The detent controller gives a detent in operation of the control member by applying an electromagnetic force between at least one of the plurality of electromagnets and the rotary member by energization control for the plurality of electromagnets according to the detent energization pattern.

5 Claims, 8 Drawing Sheets

DETENT MECHANISM

BACKGROUND OF THE INVENTION

The present invention relates to a detent mechanism which imparts a detent in controlling a control portion.

Conventionally, a rotary switch device such as a switch device disclosed in JP-A-5-94922 that is used for various types of automotive control knobs has a detent mechanism which is made up of a control stop surface portion which has ridge portions and root portions which are formed alternately on an inner surface of a casing, a coil spring provided on a rotor side of an interior of the casing and a ball which is biased by the coil spring so as to be brought into abutment with the detent surface portion.

According to the detent mechanism that is configured in this way, when the user rotates a control knob for switch operation, the ball rides over the ridge portion and moves to the root portion to thereby be caused to fall into the root portion as the rotor rotates. Namely, a feedback force given to the control knob changes around a point in time at which the ball rides over the ridge portion, whereby a detent is given in rotation of the control knob.

In the detent mechanism of the conventional rotary switch device that has been described above, since detents are given through mechanical actions, a control stop pattern is limited to a single pattern, and hence, only one type of detent interval and detent strength (click feel) can be given. In this detent mechanism, in order to switch detent intervals and detent strengths, a number of detent mechanisms corresponding to the number of types of switching become necessary, resulting in an increase in size of the switch device.

SUMMARY OF THE INVENTION

The invention was made in view of the situations, and an object thereof is to provide a detent mechanism which can switch detent patterns with a simple configuration.

With a view to attaining the object, according to the invention, a detent mechanism includes;

a control member to be operated rotationally;

a rotary member including a pair of magnetic poles adapted to rotate in conjunction with the control member;

a plurality of electromagnets provided along a rotational path of the magnetic poles of the rotary member; and a detent controller that has a detent energization pattern in which a current energization direction and an energization amount are determined for the plurality of electromagnets, wherein the detent controller gives a detent in operation of the control member by applying an electromagnetic force between at least one of the plurality of electromagnets and the rotary member by energization control for the plurality of electromagnets according to the detent energization pattern.

According to the invention, when the control member is operated to rotate, at least one of the plurality of electromagnets is energized so as to give the detent in operation of the control member by the electromagnetic force applied between the relevant electromagnet and the magnetic pole of the rotary member. Consequently, it becomes possible to select a position in the rotation of the control member where the detent is to be generated and to select a strength of detent by selecting the electromagnet to be energized, switching directions in which current energization is applied to the electromagnet and controlling the amount of energization applied to the electromagnet. Namely, it becomes possible to switch detent patterns with the simple configuration.

BRIEF DESCRIPTION OF THE DRAWINGS

FIGS. 3A to 3D are plan views showing rotational positions of a permanent magnet, in which FIG. 3A shows that the rotational position of the permanent magnet is at 0°, FIG. 3B shows that the rotational position of the permanent magnet is at 90°, FIG. 3C shows that the rotational position of the permanent magnet is at 180°, and FIG. 3D shows that the rotational position of the permanent magnet is at 270°.

FIGS. 5A to 5D are plan views showing rotational positions of a permanent magnet, in which FIG. 5A shows that the rotational position of the permanent magnet is at 45°, FIG. 5B shows that the rotational position of the permanent magnet is at 135°, FIG. 5C shows that the rotational position of the permanent magnet is at 225°, and FIG. 5D shows that the rotational position of the permanent magnet is at 315°.

FIGS. 7A to 7C are drawings, corresponding to FIG. 3, which show a second embodiment and correspond to FIG. 3, in which FIG. 7A shows that the rotational position of the permanent magnet is at 45°, FIG. 7B shows that the rotational position of the permanent magnet is at 135°, FIG. 7C shows that the rotational position of the permanent magnet is at 270°.

DETAILED DESCRIPTION OF PREFERRED EMBODIMENTS

First Embodiment

Hereinafter, referring to FIGS. 1 to 6, a first embodiment of the invention will be described.

Figure 1:
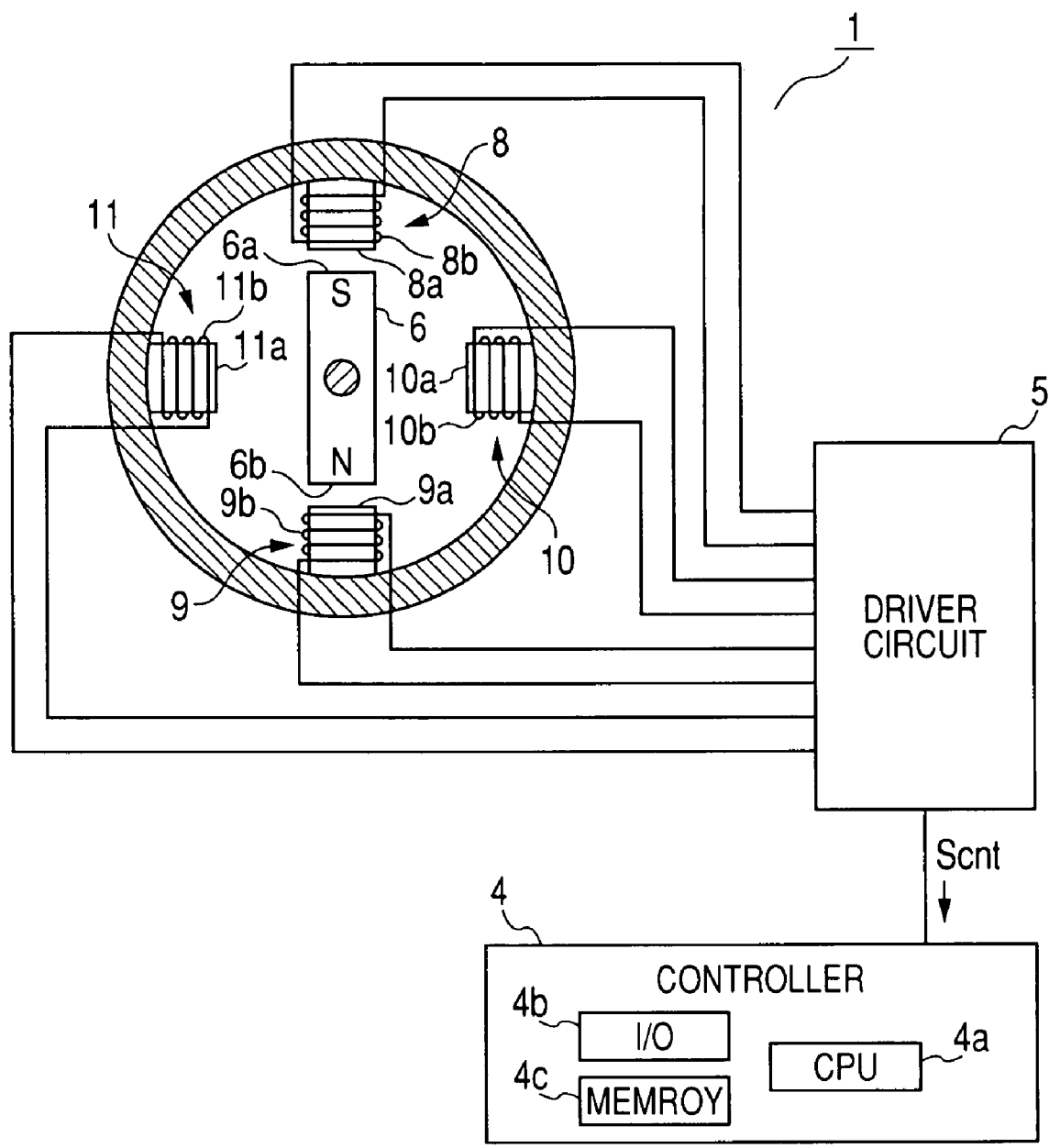
FIG. 1 is a schematic plan view of a rotary switch mechanism of a first embodiment of the invention, including an electrical block configuration thereof.
Figure 2:
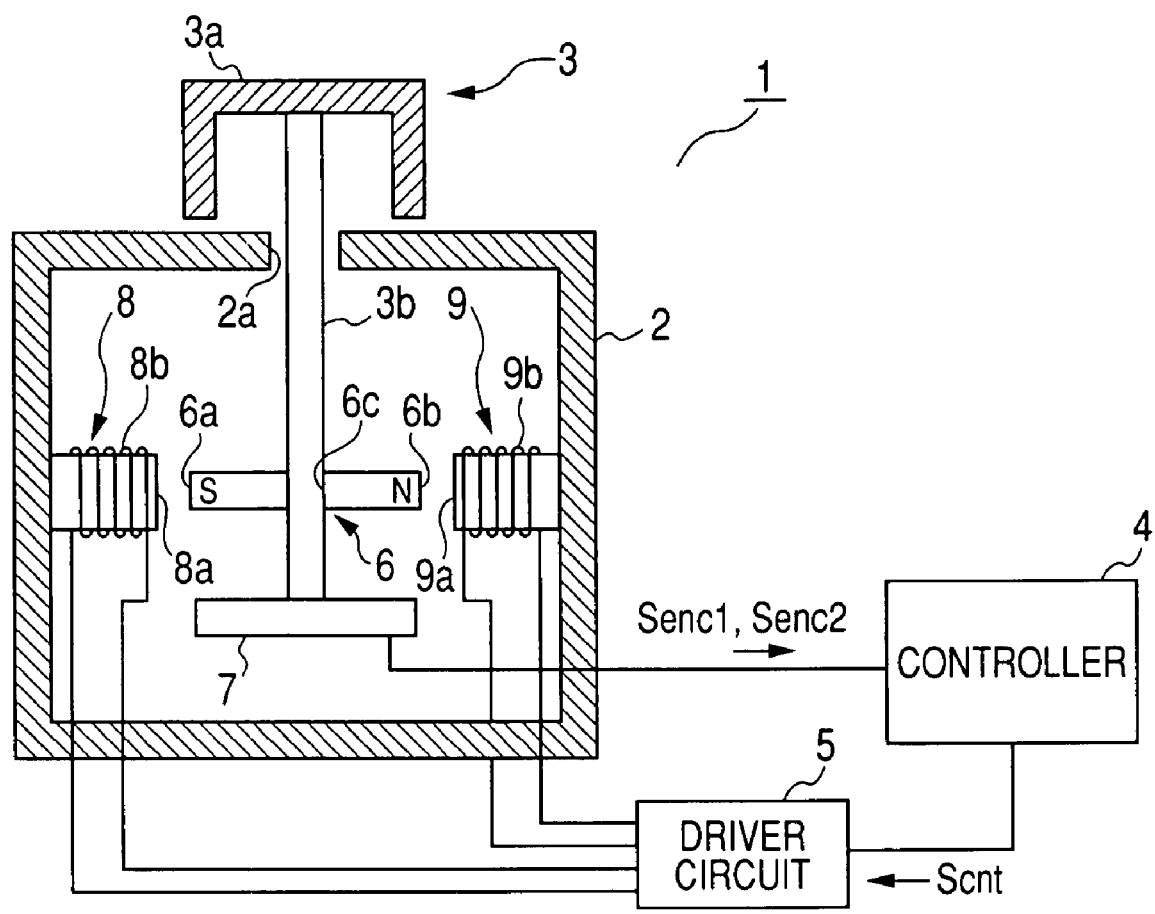
FIG. 2 is a schematic side view of the rotary switch mechanism, including an electrical block configuration thereof.

FIGS. 1 and 2 are drawings which show the configuration of part of a rotary switch module 1 used as a heater control switch of a motor vehicle to which the invention is applied. The rotary switch mechanism 1 (corresponding to the detent mechanism) is made up of a parallelepiped box-shaped switch body 2, a control knob 3 (corresponding to the control member) disposed on an upper side of the switch body 2, a controller 4 (corresponding to the detent control means), and a driver circuit 5, the controller 4 and the driver circuit 5 being provided outside the switch body 2.

In FIG. 2, the control knob 3 is made up of a control portion 3a which is formed into a bottomed cylindrical shape which is opened at its lower end and a shaft portion 3b which rotates together with the control portion 3a. The shaft portion 3b is formed slightly smaller in diameter than an opening 2a provided in an upper portion of the switch body 2 and extends downwards from a center of a lower surface of the control portion 3a so as to pass through the opening 2a to be inserted into the switch body 2. Then, the shaft portion 3b is supported rotatably by a shaft support portion, not shown. Consequently, the control knob 3 is supported rotatably about the shaft portion 3b functioning as a rotational center on the switch body 2.

In FIG. 2, in an interior of the switch body 2, a rectangular plate-shaped permanent magnet 6 (corresponding to the rotary member) is provided at a central portion. End portions of the permanent magnet 6 are made into an S pole 6a and an N pole 6b (corresponding to the pair of magnetic poles). The permanent magnet 6 is configured so as to rotate while being linked with the control knob 3 by an insertion hole 6c provided in the center thereof being fixed to the shaft portion 3b.

A disc-shaped rotary encoder 7 (corresponding to the position detecting means and the displacement detecting means) is situated below the permanent magnet 6. Although not shown, this rotary encoder 7 includes, as is known, a rotary plate on which a large number of slits are formed and arranged in a predetermined formation and an optical sensor which generates pulses when the slits passes the sensor, and the rotary plate is mounted on the shaft portion 3b in such a manner as to rotate together therewith. In addition, this rotary encoder 7 has a known configuration which generates according to rotation of the rotary plate two pulse signals S enc1, S enc2 between which there is provided a predetermined phase difference. The rotary encoder 7 is configured so as to output the pulse signals S enc1, S enc2 to the controller 4 so that the rotational direction and rotational amount (rotational angle) of the control knob 3 and the permanent magnet 6 are detected in the controller 4.

The permanent magnet 6 is such as to rotate as the control knob 3 is operated to rotate, and electromagnets 8 to 11 are disposed at equal intervals (that is, at intervals of 90°) in such a manner as to follow a rotational path of the permanent magnet 6. Since the electromagnets 8 to 11 are configured the same, for example, the electromagnet 8 will be described as a representative of the electromagnets. The electromagnet 8 has a configuration in which a conductor 8b is wound round a metallic core 8a into a coil-like shape, and like reference characters are added to like portions of the other electromagnets 9 to 11. Consequently, the electromagnets 8 to 11 are each designed to face the S pole 6a and N pole 6b of the permanent magnet 6 anywhere along the rotational path of the permanent magnet 6.

Both ends of each of the conductors 8b to 11b of the electromagnets 8 to 11 are connected to the driver circuit 5. The electromagnets 8 to 11 are each energized by application of a drive voltage Vd to the both ends of the conductors 8b to 11b. In addition, in the electromagnets 8 to 11, the direction of current which flows each of the conductors 8b to 11b changes and a magnetic field to be generated also changes according to polarity of the drive voltage Vd which is applied to the electromagnets 8 to 11, whereby in the electromagnets 8 to 11, the polarity of a magnetic pole that is formed at a portion which faces the S pole 6a and N pole 6b of the permanent magnet S can be changed. The driver circuit 15 is designed to apply the drive voltage Vd to the electromagnets 8 to 11 based on an energization control signal S cnt that is sent out from the controller 4.

The controller 4 is made up, for example, of a microcomputer which is, in turn, mainly made up of a CPU 4a and has an I/O section 4b, a memory 4c and the like. Detent pattern data which sets intervals at which detents are given relative to a rotational operation of the control knob 3 and strength thereof is inputted into the I/O section 4b from an external input device (not shown) such as a group of switches and a keyboard, and this detent patter data is made to be stored in the memory 4c.

The pulse signals S enc1, S enc2 are inputted into the CPU 4a from the rotary encoder 7, whereby the CPU 4a is made to detect the rotational direction and rotational amount of the permanent magnet 6 from the pulse signals S enc1, S enc2 so inputted. The CPU 4a is made to set an energization pattern which includes the selection of a target electromagnet to be energized, the magnitude of voltage to be applied to the electromagnet, the energizing direction of current to be supplied to the electromagnet based on the rotational direction and rotational amount so detected and the detent pattern data stored in the memory 4c and to output an energization control signal S cnt which indicates the energization pattern so set to the driver circuit 5.

Next, the function of the embodiment will be described by reference to FIGS. 3A to 6 as well.

The rotary switch mechanism 1 is made to perform a predetermined switching operation in relation to heater control such as adjusting temperature to be set, changing air flow directions and selecting vents from which air is introduced. Here, the operation of the rotary switch mechanism 1 will be described which is intended to give detents (click feel) relative to rotational operation of the control knob 3 in order to cause the user to recognize that these switching operations have duly performed.

Figure 3A:
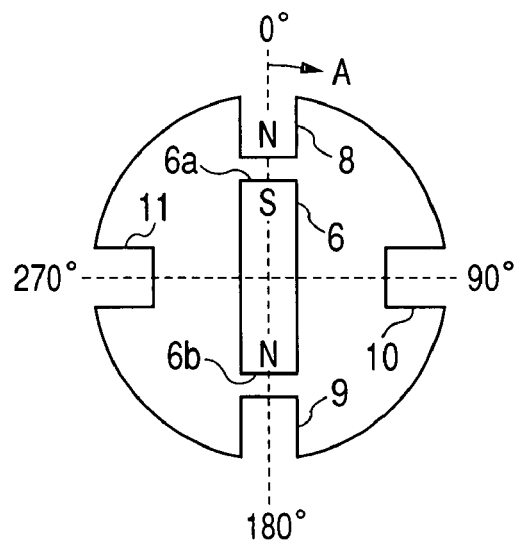

Firstly, a click pattern will be described in which two detents are given every time the control knob 3 is rotated one revolution (a revolution of 360°) in a clockwise direction (that is, in a direction indicated by an arrow A in FIGS. 3A to 3D). Note that in this embodiment, as is shown in FIG. 3A, a rotational position of the permanent magnet 6 in which the S pole 6a of the permanent magnet 6 faces the electromagnet 8 is regarded as 0° and is made to be a base of rotational angle. In addition, it is understood that detent pattern data which realizes the aforesaid detent pattern is stored in the memory 4c in advance.

FIGS. 3A to 3D shows schematically rotational positions of the permanent magnet 6 and states of energization to the respective electromagnets 8 to 11. The controller 4 detects the rotational direction and rotational angle of the control knob 3 and the permanent magnet 6 based on the pulse signals S enc1, S enc2 from the rotary encoder 7, and every time the controller 4 detects the control knob 3 and the permanent magnet 6 are rotated a predetermined angle in the direction indicated by the arrow A, the controller 4 changes the energization control signal S cnt which is sent out to the driver circuit 5, whereby the energization state of the electromagnets 8 to 11 is changed.

Figure 3B:
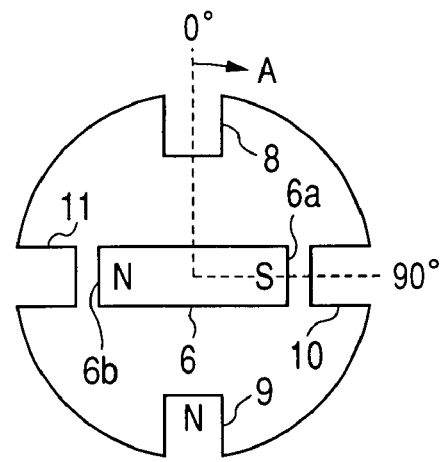

To be specific, the controller 4 magnetizes the electromagnet 9 to the N pole and puts the other electromagnets 8, 10, 11 in a non-energized state when the permanent magnet 6 is rotated to reach a rotational angle of 90° as is shown in FIG. 3B. In addition, the controller 4 controls energization of the electromagnets in such a manner as that the electromagnet 8 is magnetized to the N pole and the other electromagnets 9, 10, 11 are put in a non-energized state when the permanent magnet 6 is rotated to reach a rotational angle of 270° as is shown in FIG. 3D.

Figure 4:
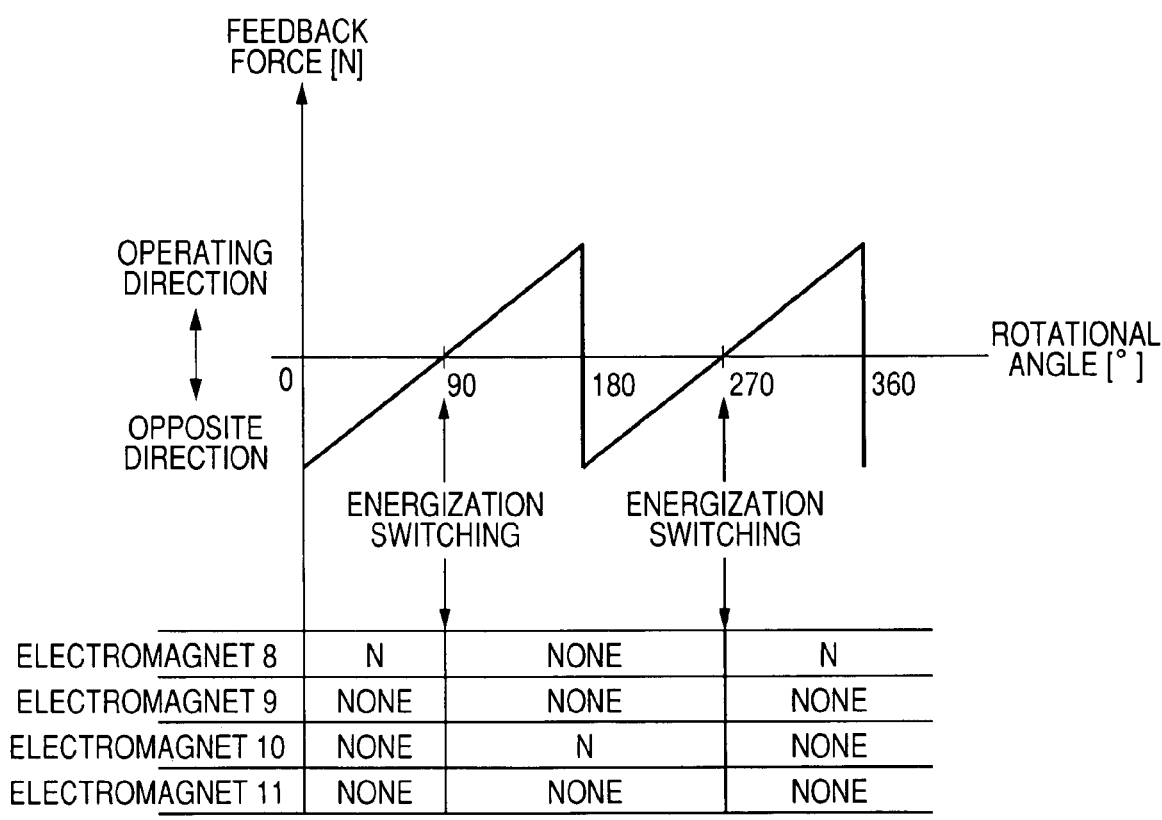
FIG. 4 is a drawing showing a relationship between a feedback force and the rotational position when two detents are given.

FIG. 4 shows a relationship between the rotational angle of the control knob 3 and a feedback force given to the control knob 3. A feedback force given to the control knob 3 changes as is shown in FIG. 4 by controlling the energization to the electromagnets 8 to 11 in the manner that has been described above.

Namely, with the rotational angle of the permanent magnet 6 lying between 0° to 90°, when the user operates to rotate the control knob 3 in the direction indicated by the arrow A, an electromagnetic force (an attracting force) which is applied between the S pole 6a and the electromagnet 8 acts on the control knob 3 to resist the rotation in the direction indicated by the arrow A. Because of this, an operation force which is larger than normally required is necessary to rotate the control knob 3 in the direction indicated by the arrow A.

In addition, with the rotational angle of the permanent magnet 6 lying between 90° to 180°, when the user operates to rotate the control knob 3 in the direction indicated by the arrow A, an electromagnetic force (an attracting force) which is applied between the S pole 6a and the electromagnet 9 acts on the control knob 3 to assist the rotation in the direction indicated by the arrow A. Because of this, the control knob 3 can be rotated in the direction indicated by the arrow A with an operation force which is smaller than normally required.

Figure 3C:
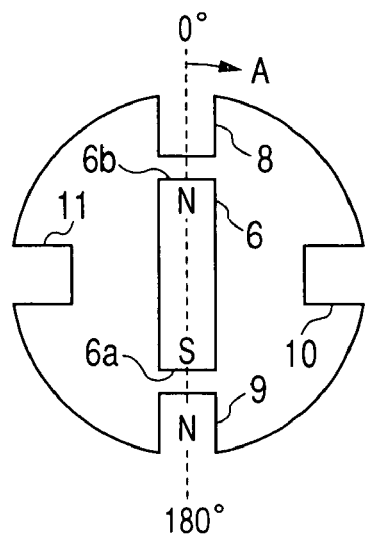
Figure 3D:
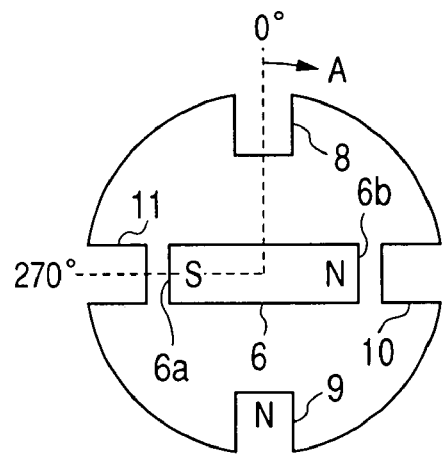

Thereafter, as is shown in FIG. 3C, when the rotational angle of the permanent magnet 6 reaches 180°, the S pole 6a and the electromagnet 9 attract each other, whereby the S pole 6a and the electromagnet 9 are held in such a state that they face each other, thereby a detent (that is, click feel) is given relative to rotational operation of the control knob 3.

In addition, also with the rotational angle of the permanent magnet 6 lying between 180° to 360°, the force to rotationally operate the control knob 3 changes in a similar way to the cases where the rotational angle of the permanent magnet 6 lies between 0° to 180°. In addition, when the rotational angle of the permanent magnet 6 reaches 360°, a detent is given relative to rotational operation of the control knob 3.

Following the above, a click pattern will be described in which four detents are given every time the control knob 3 is rotated one revolution (a revolution of 360°) in a clockwise direction (that is, in a direction indicated by an arrow A in FIGS. 3A to 3D).

FIG. 5A to 5D shows schematically the rotation of the permanent magnet 6 and states of energization to the respective electromagnets 8 to 11. As with the case where the two detents are given, the controller 4 detects the rotational direction and rotational angle of the control knob 3 and the permanent magnet 6, and every time the controller 4 detects the control knob 3 and the permanent magnet 6 are rotated a predetermined angle in the direction indicated by the arrow A, the controller 4 changes the energization state of the electromagnets 8 to 11.

Figure 5A:
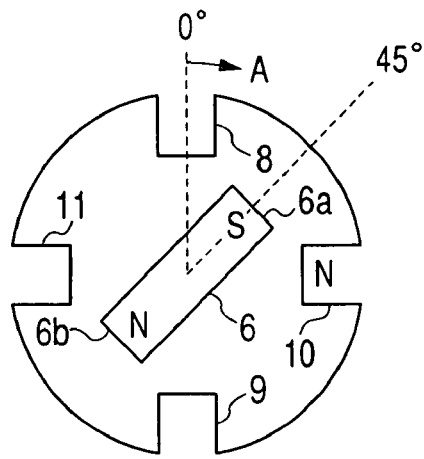
Figure 5B:
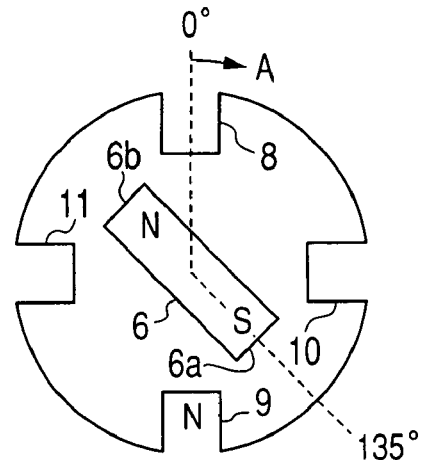
Figure 5C:
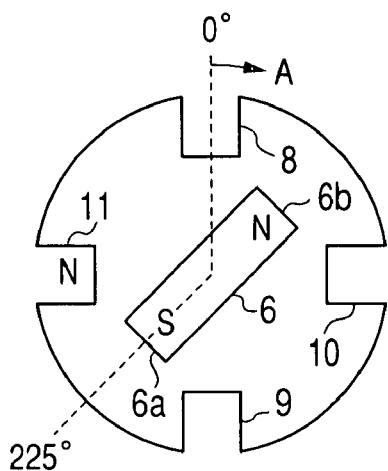
Figure 5D:
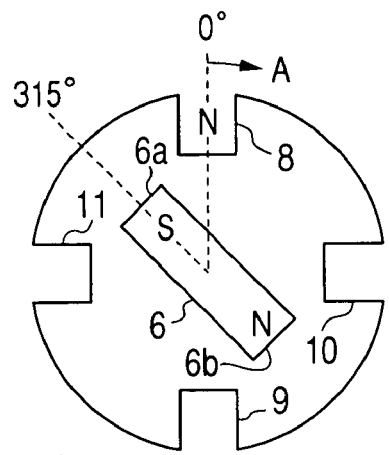

To be specific, the controller 4 controls the energization of the electromagnets in such a manner that when the rotational angle of the permanent magnet 6 reaches 45° (when a state shown in FIG. 5A results), the controller 4 magnetizes the electromagnet 10 to the N pole and puts the other electromagnets 8, 9, 11 in a non-energized state, magnetizes the electromagnet 9 to the N pole and puts the electromagnets 8, 10, 11 in a non-energized state when the rotational angle of the permanent magnet 6 reaches 135° (when a state shown in FIG. 5B results), magnetizes the electromagnet 11 to the N pole and puts the electromagnets 8, 9, 10 in a non-energized state when the rotational angle of the permanent magnet 6 reaches 225° (when a state shown in FIG. 5c results), and magnetizes the electromagnet a to the N pole and puts the electromagnets 9 to 11 in a non-energized state when the rotational angle of the permanent magnet 6 reaches 315° (when a state shown in FIG. 5D results).

Figure 6:
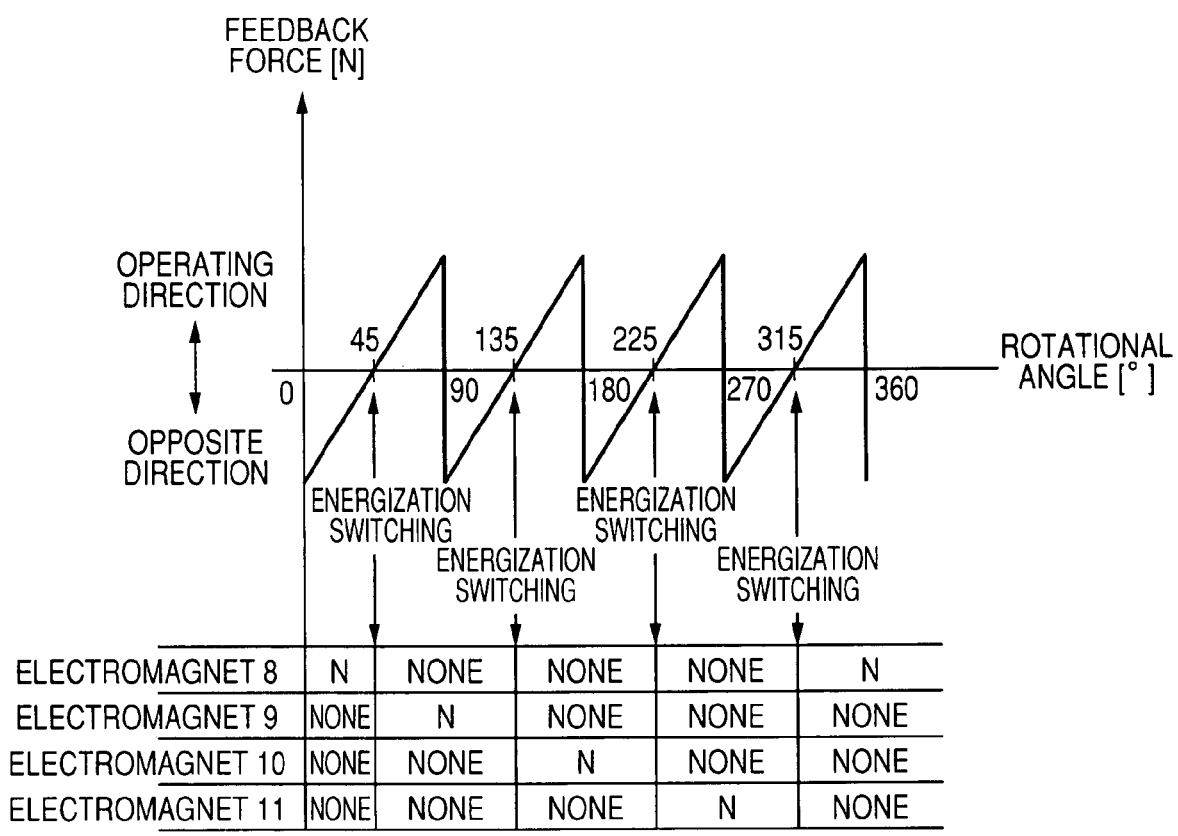
FIG. 6 is a drawing showing a relationship between a feedback force and the rotational position when four detents are given.

FIG. 6 shows a relationship between the rotational angle of the control knob 3 and a feedback force given to the control knob 3. A feedback force given to the control knob 3 changes as is shown in FIG. 6 by controlling the energization to the electromagnets 8 to 11 in the manner that has been described above.

Namely, with the rotational angle of the permanent magnet 6 lying between 0° to 45°, when the user operates to rotate the control knob 3 in the direction indicated by the arrow A, an electromagnetic force (an attracting force) which is applied between the S pole 6a and the electromagnet 8 acts on the control knob 3 to resist the rotation in the direction indicated by the arrow A. Because of this, an operation force which is larger than normally required is necessary to rotate the control knob 3 in the direction indicated by the arrow A.

In addition, with the rotational angle of the permanent magnet 6 lying between 45° to 901, when the user operates to rotate the control knob 3 in the direction indicated by the arrow A, an electromagnetic force (an attracting force) which is applied between the S pole 6a and the electromagnet 10 acts on the control knob 3 to assist the rotation in the direction indicated by the arrow A. Because of this, the control knob 3 can be rotated in the direction indicated by the arrow A with an operation force which is smaller than normally required.

Thereafter, when the rotational angle of the permanent magnet 6 reaches 90°, the S pole 6a and the electromagnet 10 attract each other, whereby the S pole 6a and the electromagnet 10 are held in such a state that they face each other, thereby a detent (that is, click feel) is given relative to rotational operation of the control knob 3.

In addition, also with the rotational angle of the permanent magnet 6 lying between 90° to 180°, between 180° to 270°, and between 270° to 360° (0°), the force to rotationally operate the control knob 3 changes in a similar way to the cases where the rotational angle of the permanent magnet 6 lies between 0° to 90°. In addition, when the rotational angle of the permanent magnet 6 reaches 180°, 270° and 360°, a detent is given relative to rotational operation of the control knob 3, respectively, thereby four detents being given relative to rotational operation of the control knob 3 while the control knob 3 rotates one revolution in the direction indicated by the arrow A.

As has been described heretofore, in the rotary switch mechanism 1 of the embodiment, the feedback force given to the control knob 3 is made to be changed so as to generate the detent by the electromagnetic force (the attracting force) which acts between anyone of the electromagnets 8 to 11 and the S pole 6a of the permanent magnet 6. Consequently, the position along the rotation of the control knob 3 where the detent is to be generated can be selected by switching the energization patterns to the electromagnets 8 to 11, and the strength of the detent so generated can be selected by changing the magnitude of the drive voltage Vd which is applied to the electromagnets 8 to 11.

In addition, with the rotary switch mechanism 1, for example, a set temperature adjusting switch, an air flow direction selecting switch and a vent selecting switch which are heater control switches of a motor vehicle and which require different intervals at which detents are provided and strength can be realized only by changing the energization patterns to the electromagnets 8 to 11.

Furthermore, the controller 4 is made to control the energization to the electromagnets 8 to 11 based on the rotational direction and rotational angle of the control knob 3 and the permanent magnet 6 which are detected by the rotary encoder 7. Consequently, when the control knob 3 is operated to rotate, the embodiment can contribute to reduction in consumed power and suppression of increase in temperature by sequentially energizing only the electromagnet which corresponds to the following detent position in the rotational direction and stopping the energization to the electromagnet which requires no more energization.

Second Embodiment

Figure 7A:
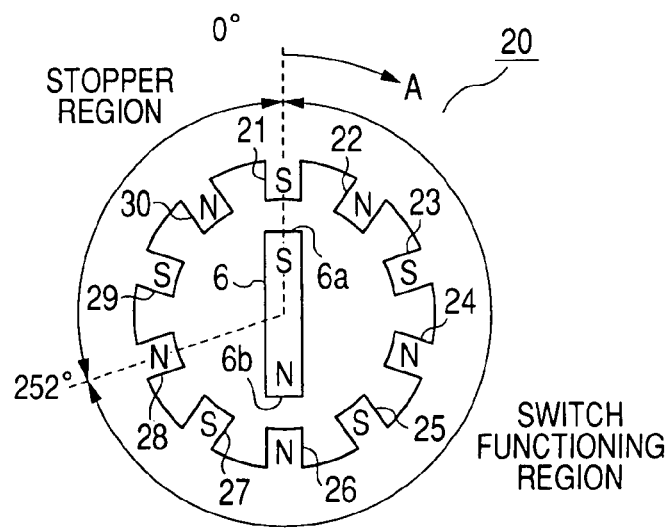
Figure 7B:
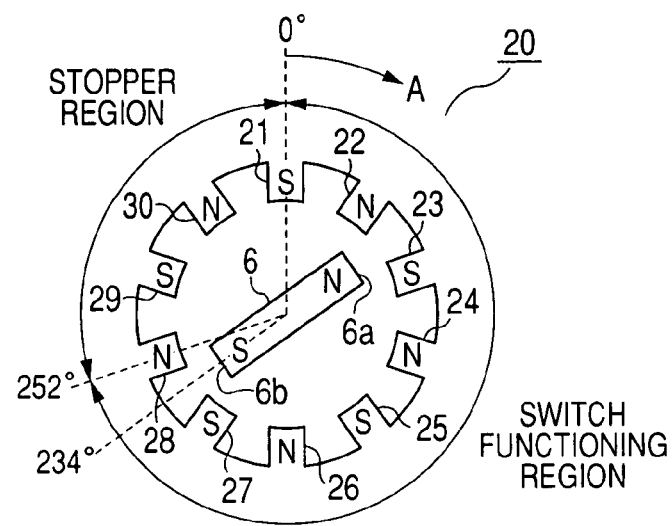
Figure 7C:
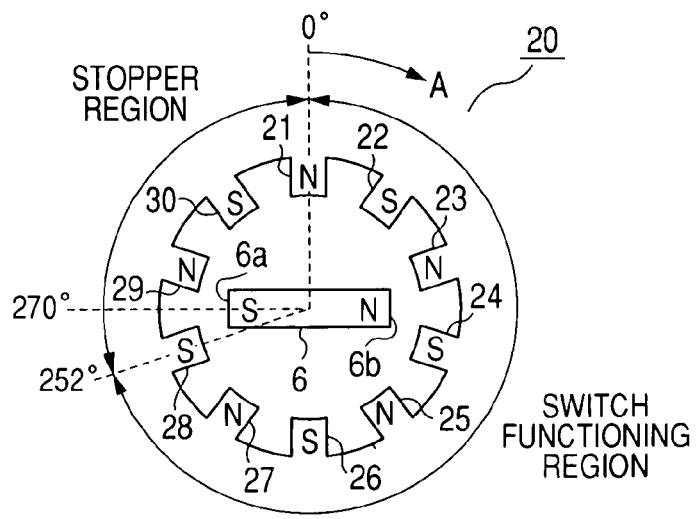
Figure 8:
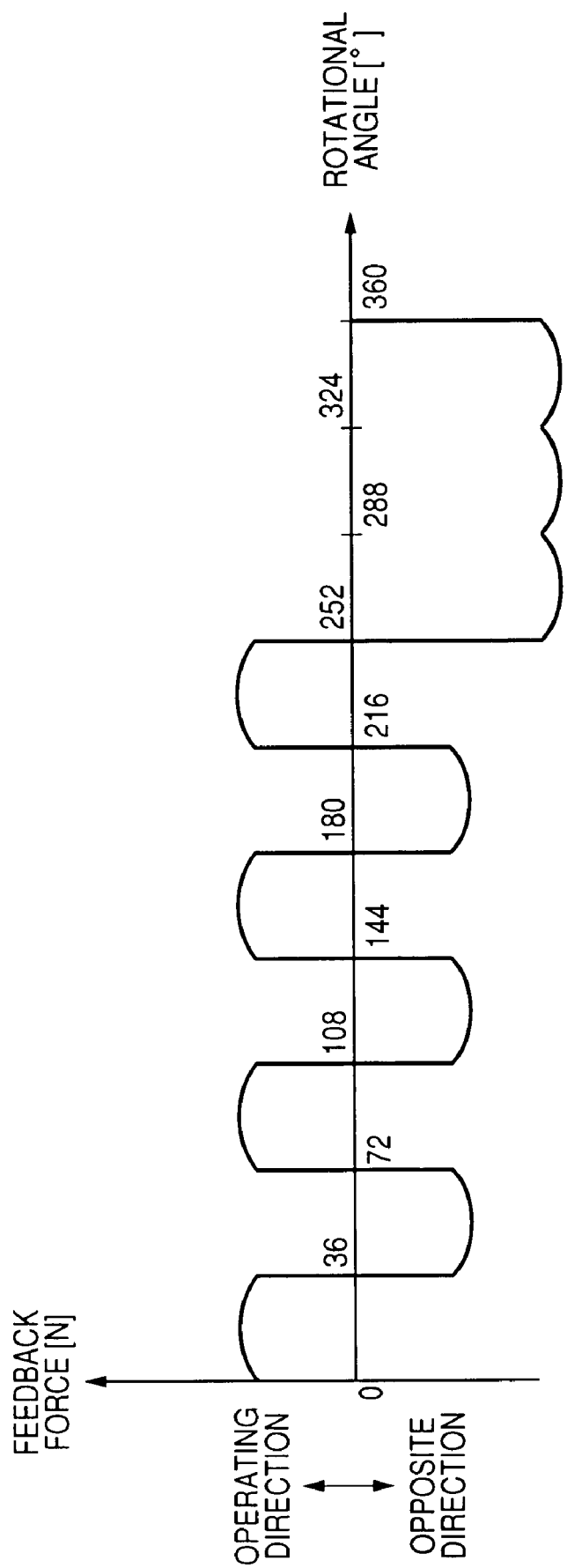
FIG. 8 is a drawing showing a relationship between feedback force and rotational position.

FIGS. 7A to 8 are drawings showing a second embodiment of the invention, and like reference numerals are given to like constituent portions to those of the first embodiment that have already been described, so that the description thereof will be omitted, and hereinafter, only portions of the second embodiment will be described which differ from the first embodiment, FIGS. 7A to 7C are drawings which correspond to FIGS. 3A to 3D and shows rotational positions of a permanent magnet 6. A rotary switch mechanism 20 (corresponding to the detent mechanism) includes electromagnets 21 to 30 which are provided on the circumference of the permanent magnet 6, and the electromagnets 21 to 30 are configured in the same way that the electromagnets 8 to 11 are configured and each have a core and a conductor. In addition, the electromagnets 21 to 30 are disposed in such a manner as to follow a rotational path of an S pole 6a and an N pole 6b of the permanent magnet 6 and are arranged at intervals of 36°. Additionally, although not shown, ends of the conductor of each of the electromagnets 21 to 30 are connected to a driver circuit 5, and the electromagnets 21 to 30 are each energized by applying a drive voltage Vd to the ends of each of the conductors thereof.

Next, the operation of the rotary switch mechanism 20 will be described which realizes a detent pattern in which four detents are given while a control knob 3 is rotated one revolution (that is, rotated through 360°) and a brake is applied to an attempted rotation of the control knob 3 which occurs after a fourth detent position.

Note that in this embodiment, as is shown in FIG. 7A, a rotational position of the permanent magnet 6 in which the S pole 6a of the permanent magnet 6 faces the electromagnet 21 is regarded as 0° and is made to be a base of rotational angle. Then, a region in rotational angle of the permanent magnet 6 which lies between 0° to 252° is regarded as a normal operation range where the switch functions normally and a switch functioning region where detents are given relative to rotational operation of the control knob 3, a region lying between 252° to 360°(0°) is regarded as a range outside the normal operation range and is made to be a stopper region where a brake is applied to the rotational operation of the control knob 3 in order to cause the user to recognize that the control knob 3 is now rotated to the region lying outside the normal operation range. In addition, a detent energization pattern for giving a detent and a stopper energization pattern for applying the brake are stored in a memory 4c in advance.

As is shown in FIG. 7A, with the rotational position of the permanent magnet 6 lying in the switch functioning region, a controller 4 performs a normal energization to the electromagnets 21 to 30 based on the detent energization pattern stored in the memory 4c so that the electromagnets 21 to 30 are magnetized to magnetic poles shown in the figure, respectively.

Then, as is shown in FIG. 7B, when the permanent magnet 6 is operated to rotate in a direction indicated by an arrow A by the user and approaches the stopper region with the S pole 6a arriving at the electromagnet 28 (the rotational angle of the permanent magnet 6 being 252°), the controller 4 changes the energization pattern based on the braking energization pattern stored in the memory 4c so that a brake voltage Vb whose voltage value is larger than the drive voltage Vd is applied to the electromagnet 28 which the S pole 6a faces and the electromagnet 23 which the N pole 6b faces. In this way, in the stopper region, a force acting to maintain the current position is applied by the application of the voltage which is larger than normally required.

Thereafter, as is shown in FIG. 7c, when the permanent magnet 6 is operated to rotate further in the direction indicated by the arrow A so that the S pole 6a reaches the electromagnet 29 (the rotational angle of the permanent magnet being 288°), the controller 4 changes the energization pattern in such a manner to reverse the polarities of the electromagnets 21 to 30 and changes the energization pattern in such a manner that the braking voltage Vb is applied, respectively, to the electromagnets which the S pole 6a and the N pole 6b face, respectively.

Even when the permanent magnet 6 is operated to rotate further in the direction indicated by the arrow A thereafter, as in the way described above, when the S pole 6a reaches the following electromagnet, the controller 4 changes the energization pattern in such a manner as to reverse the polarities of the electromagnets 21 to 30 and changes the energization pattern in such a manner that the braking voltage Vb is applied, respectively, to the electromagnets which the S pole 6a and the N pole 6b face, respectively.

FIG. 8 shows a relationship between the rotational angle of the control knob 3 and a feedback force applied to the control knob 3. In the event that the user operates to rotate the control knob 3 in the direction indicated by the arrow A by controlling the energization to the electromagnets 21 to 30 in the way described above, a feedback force applied to the control knob 3 changes depending upon the rotational position (rotational angle) of the control knob 3, as is shown in FIG. 8.

To be specific, with the rotational angle of the permanent magnet 6 lying between 0° to 18°, an electromagnetic force (a repulsive force) acting mainly between the S pole 6a and the electromagnet 21 and the N pole 6b and the electromagnet 26 is applied to the control knob 3 in such a manner as to assist the rotation in the direction indicated by the arrow A. with the rotational angle of the permanent magnet 6 lying between 18° to 36°, an electromagnetic force (an attracting force) acting mainly between the S pole 6a and the electromagnet 22 and the N pole 6b and the electromagnet 27 is applied to the control knob 3 in such a manner as to assist the rotation in the direction indicated by the arrow A. In this way, with the rotational angle of the permanent magnet 6 lying between 0° to 36°, the force is caused to act on the control knob 3 which attempts to hold the control knob 3 in the position of 360.

Thereafter, when the rotational angle of the permanent magnet 6 reaches 361, attracting forces acting, respectively, between the S pole 6a and the electromagnet 22 and the N pole 6b and the electromagnet 27 hold the S pole 6a and the electromagnet 22 and the N pole 6b and the electromagnet 27 in a face-to-face state, respectively, whereby detents (click feel) are given relative to rotational operation of the control knob 3

In addition, with the rotational angle of the permanent magnet 6 lying between 36° to 54°, an electromagnetic force (an attracting force) acting mainly between the S pole 6a and the electromagnet 22 and the N pole 6b and the electromagnet 27 is applied to the control knob 3 in such a manner as to resist the rotation in the direction indicated by the arrow A. with the rotational angle of the permanent magnet 6 lying between 54° to 72°, an electromagnetic force (a repulsive force) acting mainly between the S pole 6a and the electromagnet 23 and the N pole 6b and the electromagnet 28 is applied to the control knob 3 in such a manner as to resist the rotation in the direction indicated by the arrow A. In this way, with the rotational angle of the permanent magnet 6 lying between 36° to 72°, the force is caused to act which attempts to return the control knob 3 to the position of 36°.

Thereafter, in the similar manner, a force is caused to act which attempts to hold the permanent magnet 6 in the positions of 108° and 180°, whereby detents are given at intervals of 72° in rotational operation of the control knob 3.

Then, when the control knob 3 is operated to rotate in the direction indicated by the arrow A and approaches a boundary between the switch functioning region and the stopper region, namely, with the rotational angle of the permanent magnet 6 lying between 216° to 252°, the feedback force also changes in the similar way to the case where the rotational angle of the permanent magnet 6 lies between 0° to 36°, and when the rotational angle of the permanent magnet 6 reaches 252°, a detent is given relative to rotational operation of the control knob 3 in the similar way to the case where the rotational angle of the permanent magnet 6 reaches 36°.

When the rotational angle of the permanent magnet 6 is 252°, as has been described above, a large electromagnetic force (an attracting force) which acts between the S pole 6a and the electromagnet 28 and the N pole 6b and the electromagnet 22 is applied to the control knob 3 in such a manner as to resist the rotation in the direction indicated by the arrow A. Because of this, in order for the control knob 3 to be operated to rotate in the direction indicated by the arrow A, an operation force which is larger than the electromagnetic force or an extremely large operation force becomes necessary. Namely, a state results in which a brake is being applied to the rotational operation of the operation knob 3.

However, it is considered that the user rotates further the control knob 3 with a larger operation force than the electromagnetic force described above. As this occurs, as has been described above, when the S pole 6a reaches the next electromagnet, the feedback force is given which assists in rotational operation of the control knob 3. Then, in order to cause a force resisting the rotational operation of the control knob 3 to act, the polarities of the electromagnets 21 to 30 are reversed. Thereafter, the polarities of the electromagnets 21 to 30 are reversed so as to cause a feedback force resisting the rotational operation of the control knob 3 to act at all times, whereby the braking force is made to be applied at all times to the rotational operation of the control knob 3 in the stopper region.

As has been described heretofore, the rotary switch mechanism 20 of this embodiment is made to be energized in advance whether or not the control knob 3 is operated to rotate such that the all the electromagnets 21 to 30 are magnetized to the polarities shown in FIG. 7A. By this configuration, detent positions and detent intervals are formed in a fixed fashion, whereby the control of energization to the electromagnets 21 to 30 by the controller 4 can be implemented easily. In addition, in this case, the selection pattern for selecting the electromagnet to be energized, polarity pattern of drive voltage Vd and energization pattern related to the magnitude of the drive voltage Vd are changed so that the electromagnets are energized in advance based on the energization pattern, whereby the detent positions, detent intervals, detent strengths and the like can be switched.

In addition, when the control knob 3 is operated to rotate, approaching the boundary between the switch functioning region and the stopper region, the braking voltage Vb is made to be applied to the electromagnets 22, 28, whereby the large electromagnetic force (the attracting force) acting between the electromagnets 28, 22 and the S pole 6a and N pole 6b is allowed to act as a braking force to thereby realize a stopper function relative to the rotational operation of the control knob 3.

In addition, in the event that the user rotates the control knob 3 with the larger operation force than the electromagnetic force described above while the control knob 3 stays in the stopper region, the polarities of the electromagnets 21 to 30 are reversed every time the S pole 6a reaches the following electromagnet, and the energization pattern is made to be changed in such a manner that the brake voltage Vb is applied to the electromagnets which the S pole 6a and the N pole 6b face, whereby while the control knob 3 stays within the stopper region, a certain braking force is made to be given to the rotational operation of the control knob 3 in the direction indicated by the arrow A at all times, so that the user can be made to realize that the control knob 3 is in the region outside the proper operation range Note that the invention is not limited to the embodiments that have been described heretofore and are illustrated in the drawings, and hence, the invention can be modified or expanded to include the following features.

An energization pattern may be realized in which the controller 4 of the rotary switch mechanism 1 controls such that only one of the electromagnets 8 to 11 is energized so that one detent is given while the control knob 3 rotates one revolution.

The stopper region of the rotary switch mechanism 20 may be set as required, and hence there may be provided only the switch functioning region.

The switch functioning region and the stopper region in the rotary switch mechanism 20 do not have to be provided in the fixed fashion, and a region where the control knob 3 is rotated in a predetermined direction only through a predetermined angle may be regarded as the switch functioning region, and a region where the control knob 3 is rotated in the predetermined direction further than the switch function region may be regarded as the stopper region. By this configuration, the degree of freedom in setting detent intervals and positions where the brake is applied is increased, and therefore, a larger number of types of detent patterns and brake patterns can be realized.

In addition, in this case, when the controller 4 of the rotary switch mechanism 20 detects the stop of rotational operation of the control knob 3 or rotational operation of the control knob 3 in an opposite direction to the direction indicated by the arrow A based on pulse signals S enc1, S enc2 sent from the rotary encoder 7, the controller 4 may be configured so as to return the drive voltage Vd that would otherwise be applied to the electromagnets 21 to 30. By this configuration, the applied brake can be released through the simple operation of the control knob 3, The number of electromagnets disposed on the circumference of the permanent magnet 6 and number of pairs of magnetic poles possessed by the permanent magnet 6 can be modified as appropriately according to the number of detent intervals required. Consequently, in the event that the number of pairs of magnetic poles possessed by the permanent magnet 6 is increased whereas the number of electromagnets is decreased, the energization control by the controller 4 can be simplified.

What is claimed is:

1. A detent mechanism comprising:
a control member to be operated rotationally;
a rotary member including a pair of magnetic poles adapted to rotate in conjunction with the control member;
a plurality of electromagnets provided along a rotational path of the magnetic poles of the rotary member; and
a detent controller that has a detent energization pattern in which a current energization direction and an energization amount are determined for the plurality of electromagnets,
wherein the detent controller gives a detent in operation of the control member by applying an electromagnetic force between at least one of the plurality of electromagnets and the rotary member by energization control for the plurality of electromagnets according to the detent energization pattern.

2. The detent mechanism according to claim 1, wherein the detent energization pattern in the detent controller is changeable.

3. The detent mechanism according to claim 1 further comprising position detector that detects a rotational position of the control member, wherein the detent controller changes the detent energization pattern according to a result of detection of a rotational position of the control member by the position detector.

4. The detent mechanism according to claim 1, wherein the detent controller includes a stopper energization patter of which an energization amount is set large compared to that of the detent energization pattern and performs energization control for a predetermined electromagnet of the plurality of electromagnets based on the stopper energization pattern.

5. The detent mechanism according to claim 4 further comprising a displacement detector that detects a predetermined rotational angle range of the control member in a predetermined direction, wherein the detent controller energizes at least one of the electromagnets which the magnetic pole of the rotary member meets based on the detent energization pattern until the control member is operated to rotate in the predetermined direction to surpass the predetermined rotational angle range, wherein the detent controller energizes the electromagnets which the magnetic pole of the rotary member meets when the control member is rotated in the predetermined direction after the control member is rotated to surpass the predetermined rotational angle based on the stopper energization pattern, and wherein the detent controller stops the energization based on the stopper energization pattern when the control member is rotated in a reverse direction to the predetermined direction or the rotation of the control member is stopped.

* * * * *